Patented June 30, 1931

1,812,526

UNITED STATES PATENT OFFICE

OTTO GROSS AND FRIEDRICH JOST, OF SODINGEN, GERMANY, ASSIGNORS, BY MESNE ASSIGNMENTS, TO FIRM PATENTVERWERTUNGS A. G. "ALPINA," S. A. POUR L'EXPLOITATION DE BREVETS "ALPINA," PATENTS EXPLOITATION CY. "ALPINA," LTD., OF BASEL, SWITZERLAND

PROCESS OF PURIFYING HYDROGEN

No Drawing. Application filed August 23, 1927, Serial No. 214,988, and in Germany August 26, 1926.

The present invention refers to the purification of hydrogen gas for use in the production of ammonia and for other purposes. It is an object of our invention to free the hydrogen from all impurities or foreign matter.

As is well known to those skilled in the art, the foreign matter contained in hydrogen is particularly detrimental in the catalytic synthesis of ammonia. Hydrogen gas, unless prepared by electrolytic decomposition of water, contains foreign matter. For instance, if produced from Dawson gas or water gas or from coke oven gas, it contains carbon dioxide, hydrogen sulfide, sulfur dioxide and carbon monoxide. These impurities are detrimental to the catalytic synthesis of ammonia and can be removed by the process forming the subject matter of the present invention.

In the processes for the purification of hydrogen, as hitherto used, the carbon dioxide, hydrogen sulfide and sulfur dioxide are as a rule removed by means of chemicals or solutions having an alkaline reaction, while the carbon monoxide is absorbed by copper salt solutions. Another method for removing the carbon monoxide consists in conducting the hydrogen, which has been freed from the other impurities, at an elevated temperature and increased pressure in contact with suitable catalysts, which contain finely divided metals of the iron group. In the latter treatment methane gas and water are formed. The methane gas is not detrimental to most catalytic processes including the synthetic production of ammonia at low pressure and temperature. The water vapor can easily be eliminated by drying.

While this known method as such is useful and may also be employed in purifying mixtures of hydrogen and nitrogen, it still involves the drawback that after some time the catalyst is "poisoned", losing its capacity of decomposing carbon monoxide, more especially if the hydrogen to be treated is produced from coke oven gas or, either directly or indirectly, from coke. It has therefore proved necessary to first treat the hydrogen with an alkali or with an agent having an alkaline reaction in order to first remove all traces of sulfur dioxide, hydrogen sulfide, carbon dioxide and the like. Unless the hydrogen is subjected to such preliminary purifying treatment, the catalyst will be poisoned already in a few hours.

The present invention is based upon the surprising discovery that if two bodies of catalyst are arranged in series, no poisoning of the second catalyst will take place, if the hydrogen, before passing in contact with the second catalyst body, is subjected to another treatment with an alkali or with an agent of alkaline reaction. These purifying agents may be employed in solid or fused state or in solution.

In this manner the life of the second catalyst will be from ten to a hundred times longer than without such treatment.

With the aid of this process carbon dioxide, hydrogen sulfide and sulfur dioxide are first eliminated from the impure hydrogen by means of agents reacting in an alkaline manner, whereafter the hydrogen is conducted at an elevated temperature and under increased pressure in contact with finely distributed metals of the iron group acting as catalysts. The gas having left this first catalyst chamber then undergoes a second purification treatment by agents having an alkaline reaction and is then brought in contact at an elevated temperature and under increased pressure with another body of a catalyst containing a finely distributed metal of the iron group.

Of the metals of the iron group nickel, which is known to have catalytic properties, has proved to be particularly efficient. It has further been found that the presence of a compound of an alkali forming metal, an alkaline earth metal, or an earth metal, will considerably increase the catalytic action. These compounds may also be deposited on carriers. They are known to exert an activating effect on the catalytic action of the heavy metals, such as nickel.

The earth metals are the elements of the third group of the periodic system, with the exception of boron, gallium, indium and thallium and include aluminum, scandium, yttrium, lanthanum and the rare earths.

The production of the catalysts is preferably effected in such manner that carriers presenting a great surface and which are resistive against chemical influences are impregnated with the nitrate or nitrates of one or several of the metals mentioned above and are then heated to decompose the salts. During decomposition or after it, hydrogen or a gas containing hydrogen, is conducted in contact with the gas in order to reduce it. Preferably the production of the catalysts is effected at low temperature.

Various changes may be made in the details disclosed in the foregoing specification without departing from the invention or sacrificing the advantages thereof.

In the claim affixed to this specification no selection of any particular modification of the invention is intended to the exclusion of other modifications thereof and the right to subsequently make claim to any modification not covered by this claim is expressly reserved.

We claim:—

The process of purifying hydrogen comprising acting on the gas with an agent of alkaline reaction to eliminate carbon dioxide, hydrogen sulfide, and sulfur dioxide, conducting the gas thus treated at an elevated temperature and under increased pressure in contact with a catalyst, thereafter subjecting the gas to another treatment with an agent of alkaline reaction and finally bringing the gas at an elevated temperature and under increased pressure in contact with a catalyst.

In testimony whereof we affix our signatures.

OTTO GROSS.
FRIEDRICH JOST.